United States Patent
Ramamurthy et al.

(10) Patent No.: US 9,420,023 B2
(45) Date of Patent: *Aug. 16, 2016

(54) MANAGING ADAPTIVE STREAMING OF DATA VIA A COMMUNICATION CONNECTION

(71) Applicant: MOTOROLA MOBILITY LLC, Libertyville, IL (US)

(72) Inventors: Arjun Ramamurthy, San Diego, CA (US); Ajay K. Luthra, San Diego, CA (US); Mark S. Schmidt, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/523,841

(22) Filed: Oct. 24, 2014

(65) Prior Publication Data
US 2015/0046571 A1 Feb. 12, 2015

Related U.S. Application Data

(63) Continuation of application No. 13/409,247, filed on Mar. 1, 2012, now Pat. No. 8,874,634.

(51) Int. Cl.
*H04L 29/06* (2006.01)
*H04L 29/08* (2006.01)
(Continued)

(52) U.S. Cl.
CPC ............ *H04L 65/60* (2013.01); *H04L 65/4084* (2013.01); *H04L 65/602* (2013.01); *H04L 65/80* (2013.01); *H04L 67/32* (2013.01);
(Continued)

(58) Field of Classification Search
CPC .................................. H04L 65/60; H04L 67/32
USPC ........................ 709/219, 220, 221, 222, 217
See application file for complete search history.

(56) References Cited

U.S. PATENT DOCUMENTS 6,105,064 A 8/2000 Davis et al.
6,646,987 B1 11/2003 Qaddoura
(Continued)

OTHER PUBLICATIONS

"A Multi-Threshold Online Smoothing Technique for Variable Rate Multimedia Streams"—Zimmerman et al, Computer Science Department, University of Southern California, Oct. 2003 http://www.comp.nus.edu.sg/~cs5248/l07/mtfc-web.pdf.*

(Continued)

*Primary Examiner* — Randy Scott
(74) *Attorney, Agent, or Firm* — Lowenstein Sandler LLP

(57) ABSTRACT

An example method includes requesting a data stream using a buffer with an initial maximum window size for buffering received data associated with the requested data stream, receiving into the buffer one or more data segments associated with the data stream, removing from the buffer one or more data segments for use by a receiving device, and determining a current window size of the buffer, wherein the current window size is equal to the maximum window size less any data segments which have been received that have not been removed from the buffer. The method further includes comparing the current window size to a predetermined threshold, and in response to determining that the current window size is less than the predetermined threshold, increasing the maximum window size, and initiating a buffer size increase timer having a current timer value and a timer expiration value.

20 Claims, 4 Drawing Sheets

(51) Int. Cl.
*H04N 21/2343* (2011.01)
*H04N 21/439* (2011.01)
*H04N 21/442* (2011.01)
*H04N 21/6379* (2011.01)
*H04N 21/845* (2011.01)

(52) U.S. Cl.
CPC ..... *H04N21/23439* (2013.01); *H04N 21/4392* (2013.01); *H04N 21/4424* (2013.01); *H04N 21/6379* (2013.01); *H04N 21/8456* (2013.01)

(56) References Cited

U.S. PATENT DOCUMENTS

| | | | |
|---|---|---|---|
| 7,046,631 B1 | 5/2006 | Giroux et al. | |
| 8,077,775 B2 | 12/2011 | He | |
| 8,351,762 B2 * | 1/2013 | Kim | H04N 21/44004 386/201 |
| 8,874,634 B2 * | 10/2014 | Ramamurthy | H04L 65/80 709/201 |
| 2003/0086372 A1 | 5/2003 | Pate et al. | |
| 2003/0112758 A1 | 6/2003 | Pang et al. | |
| 2004/0047367 A1 | 3/2004 | Mammen | |
| 2004/0073703 A1 | 4/2004 | Boucher et al. | |
| 2004/0120256 A1 * | 6/2004 | Park | H04L 47/10 370/235 |
| 2005/0143990 A1 | 6/2005 | Chen et al. | |
| 2010/0195713 A1 | 8/2010 | Coulombe et al. | |

OTHER PUBLICATIONS

Jacobson, V. et al., "TCP Extensions for High Performance", Network Working Group, RFC 1323, May 1992.

Patent Cooperation Treaty, International Search Report and Written Opinion of the International Searching Authority for International Application No. PCT/US2013/025494, Apr. 11, 2013, 12 pages.
http://ieeexplore.ieee.org/xpls/abs_all.jsp?arnumber=4196277&tag=1 "End-to-End Congestion Control for H.264/SVC"—Apr. 2007, Xiaogang et al, IEEE Xplore.
http://www.psc.edu/index.php/networking/641-tcp-tune "Enabling High Performance Data Transfers"—Pittsburgh Supercomputing Center, Mar. 2004.
Wikipedia, the free encyclopedia, "Bandwidth-delay product", downloaded from internet Dec. 20, 2011, http://en.wikipedia.org/w/index.php?title=Bandwidth-delay_product&printable=yes, all pages.
Pittsburg Supercomputing Center, advanced networking, Carnegie Mellon University, University of Pittsburgh, Enabling High Performance Data Transfers[PSC], downloaded from internet Mar. 5, 2012, last updated Mar. 10, 2009, http://www.psc.edu/networking/projects/tcptune/, all pages.
Wikipedia, the free encyclopedia, TCP window scale option, downloaded from internet Dec. 20, 2011, http://en.wikipedia.org/w/index.php?title=TCP_window_scale_option&printable=yes, all pages.
Saamer Akhshabi. Ali C. Begen. Constantine Dovrolis: "An Experimental Evaluation of Rate-Adaptation Algorithms in Adaptive Streaming over HTTP". MMSys'11, Feb. 23-25, 2011, San Jose, California, USA, Copyright 2011 ACM D978-1-4503-0517-4/11/02, all pages.
U.S. Appl. No. 13/409,247 in the name of Arjun Ramamurthy et al., Notice of Allowance mailed Jun. 24, 2014.

* cited by examiner

MANAGING ADAPTIVE STREAMING OF DATA VIA A COMMUNICATION CONNECTION

CROSS-REFERENCE TO RELATED APPLICATIONS

This application is a continuation of U.S. patent application Ser. No. 13/409,247, filed on Mar. 1, 2012, the content of which is incorporated herein by reference in its entirety.

FIELD OF INVENTION

The present invention is related generally to managing adaptive streaming of data via a communication connection, and more particularly, to management of the adaptive data stream by managing the size of a data buffer and correspondingly the available buffer space in a device receiving the data.

BACKGROUND OF THE INVENTION

Digital distribution of content has become increasingly popular for receiving content, such as audio or video, to be rendered by a receiving device. It has also become increasingly desirable for the content to be rendered proximate the same time that the content is received or "on-demand." At least one type of on-demand or real-time digital delivery is referred to as streaming, which attempts to maximize the quality level of the content stream, while minimizing the amount of system resources necessary for supporting the rendering of the data stream, such as the memory used for buffering or maintaining the content that is stored on the receiving and rendering device. This can sometimes be a little more challenging in a packet data network, where there is no dedicated bandwidth that can be relied upon to ensure a steady flow of data as needed on demand. In some instances, the data are transmitted across a network infrastructure that at various points along the data path can be shared among multiple users, where at any given point in time, demand among the multiple users can exceed capacity, momentarily or otherwise. Demand which exceeds capacity might not only affect a particular segment of the data path but might also occur at the server which is the source of the data stream.

In some instances, the periods of high demand, which might negatively impact the ability of the server or the communication connection to convey the data, can be transitory and can result in the data being conveyed to a particular user to arrive unevenly or in bursts. As such, many client applications that are used to render a particular data stream may make use of a data buffer, which can be used to store a modest amount of data in advance of the rendering so as to smooth over periods of time during which the data flow may dip below the rates needed for supporting the rendered content at a current quality level, even though the available average data flow is more than adequate for supporting the particular level of quality. While a larger buffer will help to accommodate a greater amount of volatility or a greater variety of flow disruptions, a larger buffer generally requires an increased amount of system resources, namely the available memory, to be used in support of the data buffer, and can increase the time needed to fill the data buffer, which correspondingly can delay the start time before the streaming content begins to be presented to the user, relative to the point in time that the user requested the content.

In addition to variances associated with sourcing and delivering the data in the data stream via the communication connection, smooth rendering of content can sometimes be affected by processor playback capabilities including disruptions of the same that similarly may be transitory in nature. For example, many current devices support multi-tasking, where the capabilities of the processor is shared among multiple applications being concurrently executed on the device. Just like there can be fluctuations in the demand of data-carrying capabilities of network resources among multiple users of network resources, various applications being executed on a device can have varying levels of demand on the processor, which can provide periods of time in which the available processing capabilities for a particular application may be below what is necessary for supporting the current processing needs in accordance with the current operating setting without the user noticing a degradation in performance.

Generally, higher fidelity data streams require larger amounts of data and greater processing power for decoding and rendering the content. Alternatively lower fidelity data streams generally require smaller amounts of data and less processing power for decoding and rendering the content. As such, one can sometimes manage the performance of the playback by managing the level of quality of the streamed data to be rendered. However, generally, where possible most users will desire that their requested streams of data to be rendered using the highest level of quality that does not negatively impact the smooth uninterrupted presentation of the rendered data.

Adaptive streaming allows the level of quality to be adjusted during rendering, so as to better match the available data capacity of the communication channel as well as the processor playback capability of the device at any particular time. In at least some instances, the server will monitor the data buffer in the receiving device including the ratio of a current window size relative to a maximum window size in determining what level of quality of the data stream should be provided to the receiving device. The maximum window size is generally a fixed size that is allocated when the data connection is opened. For a particular data stream, multiple connections may be opened during the duration of delivery of the data stream. The current window size generally includes the space available in the data buffer for packets of data yet to be received as well as in at least some instances the space associated with packets of data which have been conveyed to the device but which have not yet been acknowledged. Alternatively, space typically excluded from the value of the current window size includes packets of data which have been received and acknowledged but which have not yet been used by the rendering application. During disruptions in the processing capabilities provided for the rendering of the received content, packets of data, which have been received, acknowledged, but not yet consumed by the application, can increase in the data buffer relative to the overall maximum window size of the data buffer, thereby reducing the available current window size for receiving more data. The server seeing a decrease in the current window size may determine that the device is unable to support the current data flow for a particular level of quality, where an amount of data is buffered based on a predetermined amount of time deemed desirable for smoothing over the possible variability. This may be the result of a degradation in the ability of the device to receive or render the data. Correspondingly, the server may reduce the level of quality of subsequently streamed data segments.

Generally, the value of the current window size is communicated to the server in packets sent to the server from the receiving device. In some instances, the current window size can be included in most or even sometimes all packets sent by the receiving device to the server. Because the processor loads that negatively affect available processing capabilities for rendering streamed data can sometimes occur as momentary spikes which can measurably impact the current window size which is reported to the server, in some instances the server may react to a decrease in the current window size based upon a degradation in processor performance that is only transitory in nature. While the level of quality can generally be both increased and decreased as appropriate, there can sometimes be significant delay in making changes in the current quality settings that return or increase the level of quality relative to the current capabilities of the device.

BRIEF SUMMARY

The present invention provides a method for managing adaptive streaming of data in a receiving device. The streaming of data includes data received from a server, where the server includes one or more streams of data. Each stream of data includes one or more data segments. Each data segment is encoded into one of a plurality of different versions. Each of the plurality of different versions can have a different fidelity level. The method includes requesting a data stream using a buffer with an initial maximum window size for buffering received data associated with the requested data stream, wherein the initial data segments received as part of the data stream have a first fidelity level. One or more data segments associated with the data stream are then received into the buffer, while one or more data segments for use by a processor of the receiving device are removed from the buffer. A current window size of the buffer is then determined, wherein the current window size is equal to the maximum window size less any data segments which have been received that have not been removed from the buffer for use by the processor. The current window size is then compared to a predetermined threshold. When the current window size is less than the predetermined threshold, the maximum window size is increased, where an updated maximum window size is increased to be larger than the initial maximum window size, and a buffer size increase timer having a current timer value and a timer expiration value is initiated. While the updated maximum window size is larger than the initial maximum window size and the current timer value of the buffer size increase timer is less than the timer expiration value, at regular intervals a present current window size is determined and the updated maximum current window size is adjusted, so as to minimally maintain the current window size of at least the predetermined threshold. When the updated maximum window size is adjusted so as to be no longer larger than the initial maximum window size prior to current timer value of the buffer size increase timer reaching the timer expiration value, the buffer size increase timer is terminated. When the buffer size increase timer reaches the timer expiration value, the bit rate level of subsequently received data segments is adjusted to a second fidelity level less than the first fidelity level.

The present invention further provides a method for managing an adaptive streaming of data in a receiving device. The streaming of data includes data received from a server, where the server includes one or more streams of data. Each stream of data includes one or more data segments. Each data segment is encoded into one of a plurality of different versions. Each of the plurality of different versions can have a different fidelity level. The method includes requesting a data stream using a buffer with an initial maximum window size for buffering received data associated with the requested data stream, wherein the initial data segments received as part of the data stream have a first fidelity level. One or more data segments associated with the data stream are then received into the buffer for use by a processor. During receipt of the one or more data segments, a decrease in processor performance relative to the processing of the data stream is detected by monitoring an amount of available space in the buffer. A determination is then made as to whether the decrease in processor performance is transient. When the decrease in performance is determined to be not more than transient, the maximum window size of the buffer is adjusted to maintain an amount of space greater than a predetermined threshold. When the decrease in performance is more than transient, the fidelity level of the data stream is adjusted to a second fidelity level that is less than the first fidelity level.

The present invention still further provides a data interface of a receiving device for receiving one or more streams of data from a server. The server includes one or more streams. Each stream includes one or more data segments, where each data segment is encoded into one of a plurality of different versions. Each of the plurality of different versions can have a different fidelity level. The data interface includes a transceiver adapted for communicating with the server via a communication connection. The data interface further includes a memory including a buffer for storing data received from the server via the transceiver, as well as a controller. The controller has a data stream management module adapted for requesting a data stream including one or more data segments to be received via the transceiver into the buffer, wherein the initial data segments received as part of the data stream have a first fidelity level, and removing from the buffer one or more data segments for use by a processor. The controller further has a buffer management module adapted for managing a size of the buffer including establishing a buffer having a maximum window size associated with the requested data stream, determining a current window size of the buffer, wherein the current window size is equal to the maximum window size less any data segments which have been received that have not been removed from the buffer for use by the processor, comparing the current window size to a predetermined threshold, and increasing the maximum window size when the current window size is less than a predetermined threshold. The controller still further has a timer management module adapted for initiating a buffer size increase timer having a current timer value and a timer expiration value when the current window size is less than the predetermined threshold. While the updated maximum window size is larger than the initial maximum window size and the current timer value of the buffer size increase timer is less than the timer expiration value, at regular intervals the buffer management module is further adapted for determining a present current window size and adjusting the updated maximum current window size, so as to minimally maintain the current window size of at least the predetermined threshold. The timer management module is further adapted to terminate the buffer size increase timer, when the updated maximum window size is adjusted so as to be no longer larger than the initial maximum window size prior to current timer value of the buffer size increase timer reaching the timer expiration value. The timer management module is still further adapted to adjust the bit rate level of subsequently received data segments to a second fidelity level less than the first fidelity level, when the buffer size increase timer reaches the timer expiration value.

These and other objects, features, and advantages of this invention are evident from the following description of one or more preferred embodiments of this invention, with reference to the accompanying drawings.

BRIEF DESCRIPTION OF THE SEVERAL VIEWS OF THE DRAWINGS

While the appended claims set forth the features of the present invention with particularity, the invention, together

DETAILED DESCRIPTION

Figure 1:
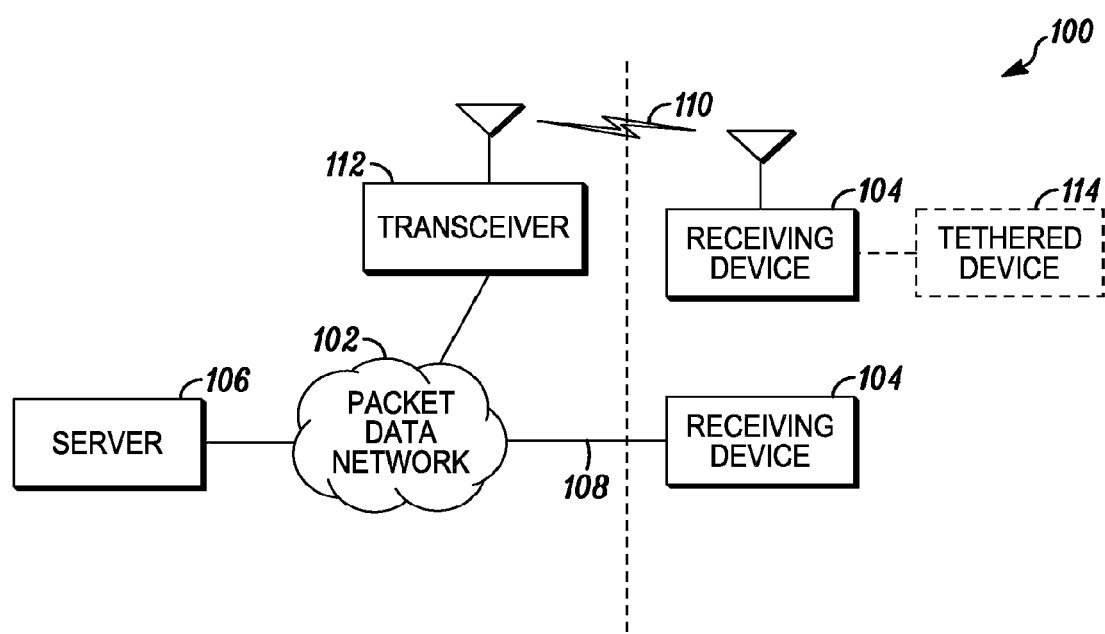
FIG. 1 is a partial block diagram of an exemplary system for sending and receiving a data stream.

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

It is beneficial to manage the size of the maximum window size, which in turn affects the current window size used by a server to determine a level of quality of a data stream to provide to a receiving device, where the maximum window size of the data buffer in the receiving device could be momentarily increased to accommodate an increasing amount of data that have been received and acknowledged but not yet consumed by the rendering application in the receiving device until it can be determined that any decrease in processor playback capability is more than transitory. This can reduce the number of instances in which the server may want to make changes to the quality level of the data being streamed.

FIG. 1 illustrates a partial block diagram of an exemplary system 100 for sending and receiving a data stream. The streaming of content over a packet data network 102, such as the Internet, has become a commonly adopted practice, where for example video clips, voice communications, music, and movies are commonly streamed from a data source, such as a content provider to a receiving device 104 of an end user. In many instances, the data stream originates with a server 106, such as a media or content server, that contains the content encoded in a form having one or more fidelity levels, where upon request a communication connection is established with the receiving device 104.

In some instances, the receiving device 104 may be coupled to the packet data network via a wired connection 108. In such an instance, the data will be conveyed to the receiving device 104 through a communication channel that may traverse various routers and gateways (not shown), which can form part of the packet data network 102, until the data stream is received at the receiving device 104. In some instances, the server 106 may be located on the same premises as the receiving device 104, in which case the number of routers and gateways, if any, through which the data stream might travel as part of the communication connection may be minimal. For example, this may be the case for a digital video recorder used to source data to multiple devices like television sets within a house. However, interestingly, while the digital video recorder at times might be the source of the data stream relative to other receiving devices 104, at other times the digital video recorder could be the receiving device 104. For example, the digital video recorder can be a receiving device 104 relative to a content provider such as a television broadcaster, a cable provider, a direct broadcast satellite provider, or a streaming server.

In some instances, the data may be delivered to the receiving device 104 wirelessly 110. In such an instance, a part of the communication path of the communication channel may include a transceiver element 112, such as an access point in the case where the path traverses a portion of a wireless LAN, or a base transceiver station in the case where the path traverses a portion of a cellular network. The transceiver element 112 can communicate the data to the receiving device 104 wirelessly. In some instances, the receiving device 104 may be the device upon which the content is being rendered and correspondingly presented to the user. In other instances, the receiving device 104 might forward the data to a device 114 tethered to the receiving device 104 for rendering and for receiving either the encoded or the decoded data. The tethered device 114, while often associated with the receiving device 104 via a wired connection, such as through a cable, could alternatively be coupled to the receiving device 104 by a wireless connection, such as a Bluetooth® connection, without departing from the teachings of the present invention.

Examples of receiving devices 104, without intending to be exhaustive, can include personal computers, tablet computers, cellular telephones, televisions, stereo systems, audio players, video game players, digital cameras, cable or satellite broadcast convertor boxes, digital video recorders, and the like. While in some instances, these devices may receive content in a broadcast type format, the present application is particularly suitable for data which are streamed over a communication connection using a packet-based communication protocol, such as a transmission control protocol, or a hyper text transfer protocol, where the receipt of packets is confirmed, and feedback from the receiving device 104 allows the server 106 to adjust the future flow of data being streamed from the server 106 to the receiving device 104. The present application is further particularly suitable for data which are streamed, or received in an on-demand format, where the receiving device 104 maintains a data buffer and attempts to use the data being streamed proximate the time of receipt.

In such an instance, the overall size of the data buffer can be modest compared to the overall size of the content that is being conveyed. The intent of the data buffer is to accommodate momentary fluctuations, which limit the ability of the network to source the data, or the playback processors ability to process and render the data. It is generally the intent of such systems to try and match the fidelity of the data stream with the ability of the network to source and send the data as well as the ability of the receiving device 104 to process and play the data. In other words, the system generally attempts to supply the highest quality version of the data while attempting to avoid pauses, interruptions, or skips in the content being conveyed to the user during the process of rendering the content. As such, the data flow is generally monitored, and the data flow adjusted as appropriate, to support a smooth playback of the content to be presented to the user.

In order to monitor the conditions at the receiving device 104, the receiving device 104 will generally establish or allocate a data buffer of fixed size upon opening a communication connection. The receiving device 104 will then communicate with the server 106 the fill status of the data buffer, and in turn the server 106 can adjust the amount and the fidelity of the data being streamed so as to not over- or under-fill the data buffer.

However, sometimes the server might aggressively respond to a condition at the receiving device 104 that is only transitory in nature. As such, in accordance with the present invention, it may be beneficial for the receiving device 104 to adjust the size of the data buffer to accommodate fluctuations in the performance of the receiving device 104, where it would be undesirable for the server 106 to transition to a lower fidelity data stream, in response to a buffer which is filling too quickly due to an impairment in the ability of the receiving device 104 to process the data. Such a momentary impairment can be the result of a surge in processing power demands in another application that is concurrently being executed within the receiving device 104. (Many devices are increasingly supporting the concurrent use of multiple programs or applications.)

Figure 2:
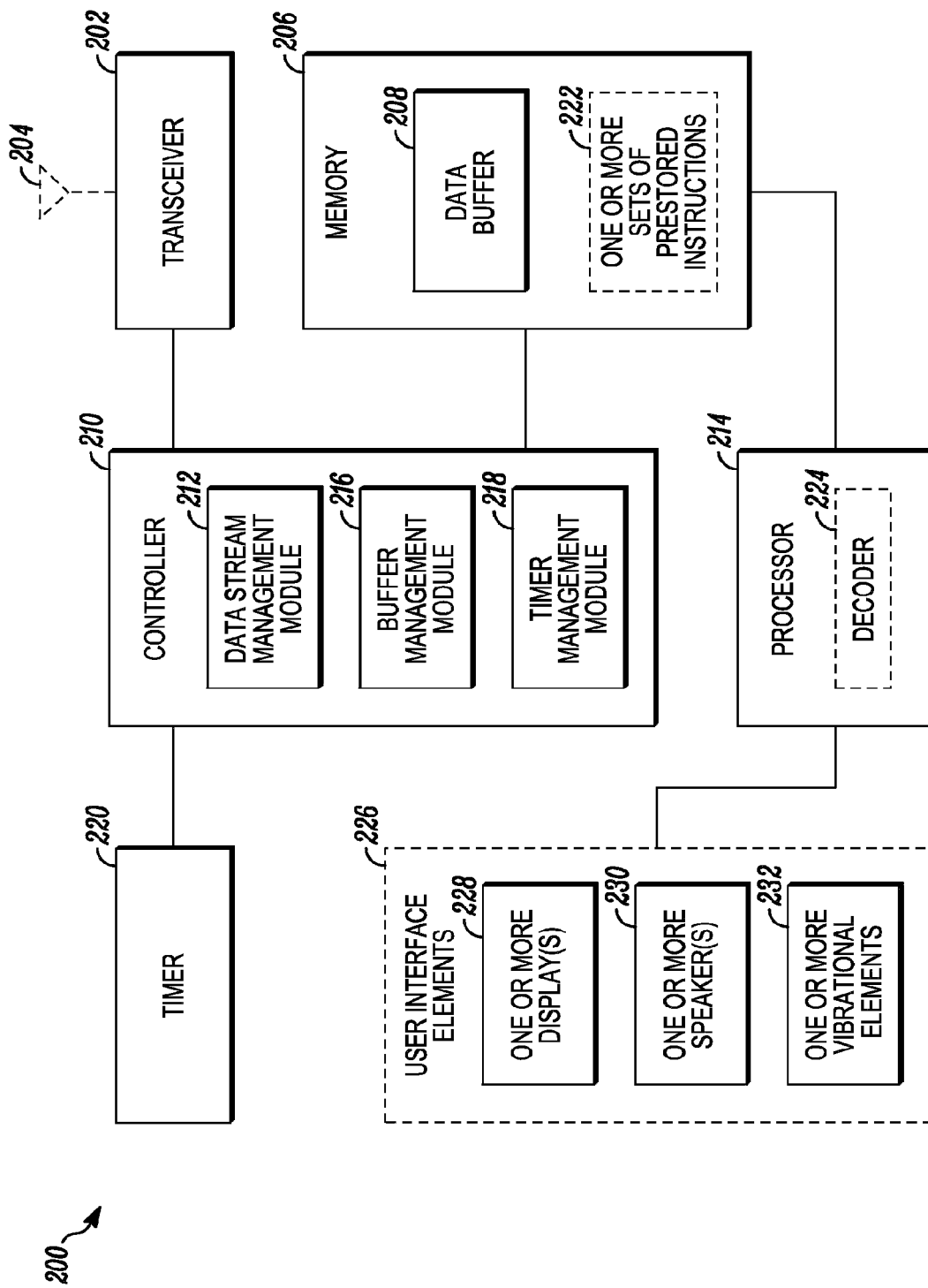
FIG. 2 is a block diagram of a receiving device including a data interface for managing adaptive streaming of data via a communication connection, in accordance with at least one embodiment of the present invention.

FIG. 2 illustrates a block diagram of a receiving device 200 including a data interface for managing adaptive streaming of data via a communication connection, in accordance with at least one embodiment of the present invention. The data interface includes a transceiver 202, which is adapted for communicating with a server 106 via a communication connection. While in some instances, the transceiver 202 may be coupled to the packet data network, and correspondingly the server 106, via a wired connection, in other instances, the transceiver 202 may be coupled to an antenna 204 for supporting a communication connection which includes a wireless component. The data interface further includes a memory 206 including a data buffer 208 for storing data received from the server 106 via the transceiver 202 and a controller 210.

The controller 210 includes a data stream management module 212 adapted for requesting a data stream including one or more data segments to be received via the transceiver 202 into the data buffer 208, wherein the initial data segments received as part of the data stream have a first fidelity level, and for removing from the data buffer 208 one or more data segments for use by a processor 214. The controller further includes a buffer management module 216 which is adapted for managing a size of the data buffer 208 including establishing a data buffer 208 having a maximum window size associated with the requested data stream, and for determining a current window size of the data buffer 208, wherein the current window size is equal to the maximum window size less any data segments which have been received that have not been removed from the data buffer for use by the processor 214. The buffer management module further compares the current window size of the data buffer 208 to a predetermined threshold and increases the maximum window size when the current window size is less than the predetermined threshold. The controller further includes a timer management module 218 which is adapted for initiating a buffer size increase timer 220 having a current timer value and a timer expiration value when the current window size is less than the predetermined threshold. Generally, when initiated, the timer will track an elapsed time until the timer 220 is deactivated or the timer expires by reaching the timer expiration value.

In some embodiments, the controller 210 is implemented in the form of a microprocessor, which is adapted to execute one or more sets of prestored instructions 222, which may be used to form at least part of one or more controller modules 212, 216, and 218. The one or more sets of prestored instructions 222 may be stored in the memory 206, which, while shown as being separate in the drawings, could be either integrated as part of the controller or coupled to the controller 210. The memory 206 can include one or more forms of volatile or non-volatile memory elements. The memory 206 may additionally or alternatively incorporate one or more forms of auxiliary storage, either fixed or removable, such as a hard drive or a floppy drive. One skilled in the art will appreciate that other further forms of memory elements could be used without departing from the teachings of the present invention. In the same or other instances, the controller 210 may incorporate state machines or logic circuitry, which can be used to implement at least partially some of the controller modules and their corresponding functionality. It is further possible that the timer 220 could be implemented as a module in the controller 210.

The receiving device 200 includes a processor 214, which is adapted for receiving data segments from the data buffer 208 and for decoding the data segments via a decoder 224 in order that the data can be rendered so as to be perceived by the user. The rendered data can be provided to the user via one of the user interface elements 226. Exemplary user interface elements include one or more displays 228, one or more speakers 230, and one or more vibrational elements 232. In this way, it may be possible for the receiving device to recreate visual, audio, as well as vibrational information, which can be experienced by the user. The processor 214 could similarly be implemented in a microprocessor. It is further possible that the same microprocessor could be used to implement both the controller 210 and the processor 214.

Figure 3:
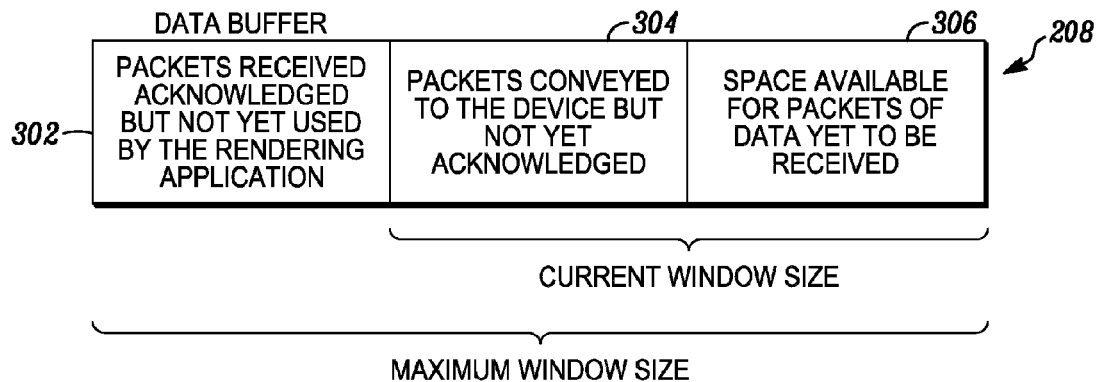
FIG. 3 is a block diagram of an exemplary data buffer.

FIG. 3 is an exemplary block diagram of a data buffer 208. The data buffer is generally a portion of the memory 206 corresponding to the maximum window size. Within the maximum window size of the data buffer 208, the space can be segregated into three sections. The data buffer includes a section 302 within which data packets or data segments have been received and acknowledged, but not yet used by the processor or, more specifically, by a rendering application executed within the processor 214. The data buffer 208 further includes a section 304 where data packets conveyed to the receiving device 200 are present, but they have not yet been acknowledged as having been received by the receiving device 200 to the server 106. The data buffer 208 still further includes a section 306 including space within the buffer which is not currently being used and is available to store further data. Generally, the current window size associated with the data buffer includes the unused portion, section 306, and in at least some instances will additionally include the section 304 being used to store data packets that have been conveyed to the receiving device but have not yet been acknowledged. As data are used by the processor, they are removed from the data buffer 208, which in turn frees up space in the buffer.

The current window size represents a value that is generally conveyed to the server 106 in communications from the receiving device 200 to the server 106. In at least some embodiments, the current window size will be present in at least some, if not all headers, of the messages communicated to the server 106 from the receiving device 200. The server 106 will use the information of the current window size to determine the amount of data that the receiving device can handle in subsequent transfers. Indirectly in connection with knowing the maximum window size, the information about the current window size can be used to determine how much of the data buffer 208 is currently being used. Additionally, the server can use the received information about the current window size as part of the process to determine if the fidelity of the subsequently transmitted data segments from the data stream should be adjusted. By adjusting the maximum window size, the receiving device 200 can impact the corresponding current window size, which in turn can then have an impact on the manner in which the server 106 continues to source data.

For example, by increasing the maximum window size, the receiving device 200 might be able to forestall the circumstances under which the server 106 might adjust the fidelity level of the portion of the data stream to be subsequently sent, in circumstances where it might be desirable to do so. Namely, the receiving device 200 could delay the server 106 reacting to instances in which the data buffer is filling up with unused data, where the processor is experiencing an unusual processing load, causing a delay in the processing of the data to be used in rendering the streamed content. A timer 220 allows the receiving device, and more specifically the data interface, to determine how long the data in the buffer have been impacted and whether the condition persists beyond a predetermined length of time. The maximum window size, and correspondingly the current window size, can be readjusted to enable the server 106 to respond to a data buffer 208 that is filling up with unused data. However, until the timer 220 expires, the maximum window size can continue to be adjusted to forestall an adjustment by the server 106. If the size of the maximum window size, and correspondingly the current window size, readjusts to its original size prior to the expiration of the timer, then the sourcing of data by the server 106 and the processing of the data by the processor 214 can continue without any adjustment to the fidelity of the transmitted data segments ever having been made.

Generally, the fidelity of the data segments refers to the quality of the signal. For audio data, fidelity can correspond to the bit rate in which the audio signal is encoded. For video data, fidelity can correspond to the resolution of the video signal or the frame rate of the encoded video signal. Generally, a lower fidelity signal comprises less data than a higher fidelity signal. As such, a longer duration of streamed content can be encoded in the same number of bits for a signal having a lower fidelity value.

Figure 4:
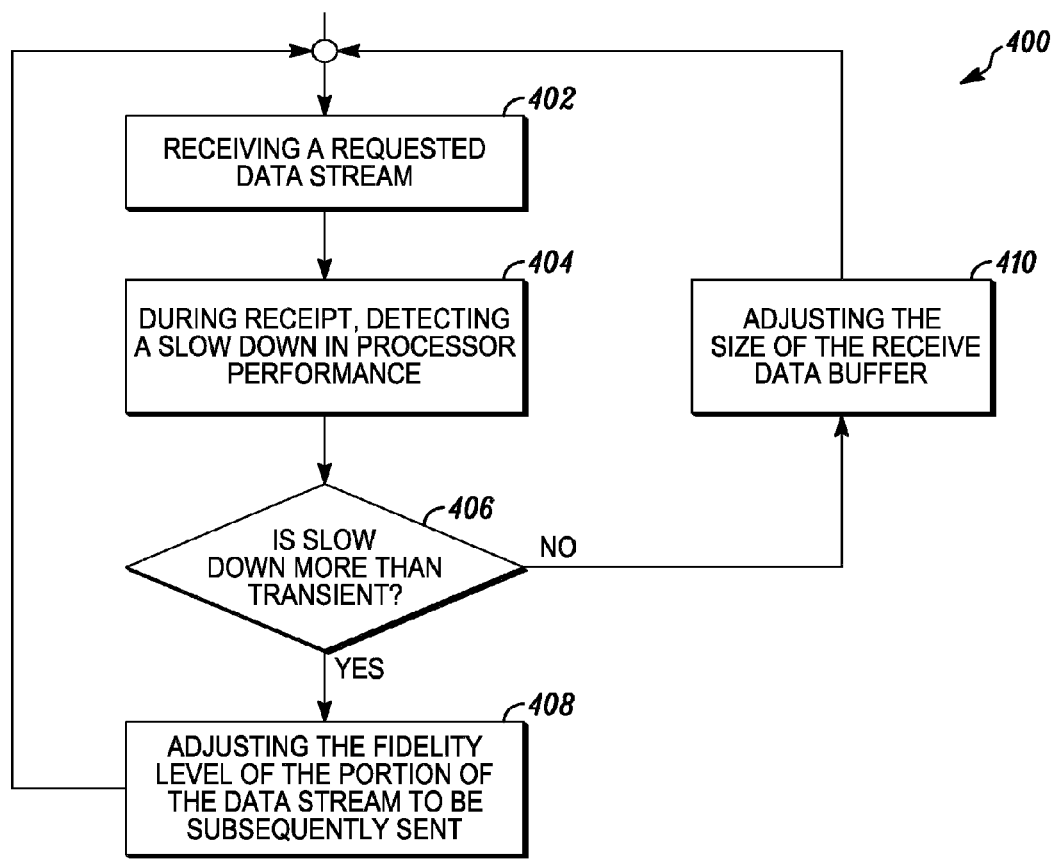
FIG. 4 is a flowchart of a method for managing adaptive streaming of data via a communication connection, in accordance with at least one embodiment of the present invention.

FIG. 4 is a flow diagram 400 of a method for managing adaptive streaming of data via a communication connection in accordance with at least one embodiment of the present invention. The method includes receiving 402 a requested data stream. During receipt of the requested data stream, the method attempts to detect 404 a slow down in processor performance. If a slow down which is more than transient is detected 406, then the fidelity level of the portion of the data stream to be subsequently sent by the server and received by the receiving device is adjusted 408 so as to have a lower fidelity level. If a slow down which is more than transient is not detected 410, then the maximum window size of the receive data buffer in the receiving device is adjusted.

Figure 5:
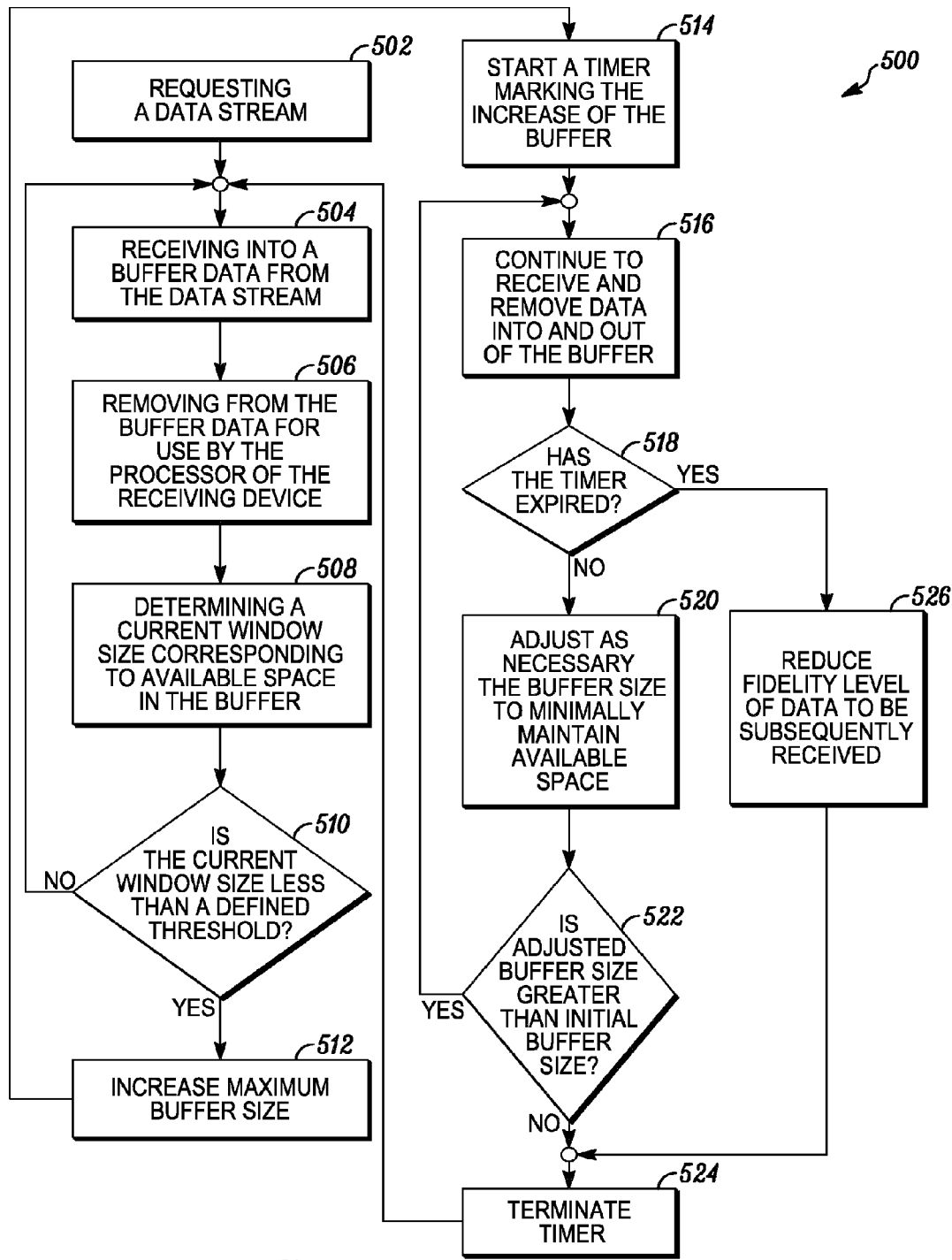
FIG. 5 is a flowchart of a method for managing adaptive streaming of data via a communication connection, in accordance with at least one embodiment of the present invention.

FIG. 5 is a more detailed flow diagram 500 of a method for managing adaptive streaming of data via a communication connection. The method includes requesting 502 a data stream from a content server. Data from the data stream are then received 504 into a buffer, while data for use by the processor of the receiving device are removed 506 from the buffer. A determination 508 is then made as to the value of the current window size, which corresponds to the available space in the buffer, which in at least some instances includes the data which have been acknowledged as having been received by the receiving device. If the current window size is less than a predefined threshold 510, then the maximum buffer size of the data buffer is increased 512, and a timer is started 514, which marks the time that the maximum buffer size was increased. If the current window size is not less than a predefined threshold 510, then no changes are made to the maximum window size of the buffer, and the receiving device continues to receive 504 data into and process 506 data out of the buffer.

Upon starting 514 the timer, the receiving device similarly continues to receive data into and process data out of the buffer 516 but also checks to see if the timer period has elapsed 518. If the timer has not elapsed, the data interface adjusts 520 as appropriate the buffer size to minimally maintain an available space within the buffer that is not below the predetermined threshold. If, prior to expiration of the timer 518 and after the maximum window size of the buffer is further adjusted 520, the adjusted maximum window size is still greater than the initial maximum window size of the buffer, then the receiving device continues to receive data and process data out of the buffer 516. If, prior to expiration of the timer 518 and after the maximum window size of the buffer is further adjusted 520, the adjusted maximum window size is still not greater than the initial maximum window size of the buffer, then the timer is terminated 524. If the timer expires 518, then the fidelity level of data to be subsequently received by the receiving device is reduced 526, and the timer is terminated 524. In this way the adaptive streaming of data via a communication connection can be managed by adjusting the maximum window size of the data buffer.

In view of the many possible embodiments to which the principles of the present invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

We claim:

1. A method comprising:
    requesting a data stream using a buffer with an initial maximum window size for buffering received data associated with the requested data stream;
    receiving, into the buffer, one or more data segments associated with the data stream;
    removing, from the buffer, one or more data segments for use by a receiving device;
    determining, by a processing device, a current window size of the buffer, wherein the current window size is equal to the maximum window size less any data segments which have been received that have not been removed from the buffer;
    comparing the current window size to a predetermined threshold;
    in response to determining that the current window size is less than the predetermined threshold, increasing, by the processing device, the maximum window size and initiating a buffer size increase timer having a current timer value and a timer expiration value; and
    while the updated maximum window size is larger than the initial maximum window size and the current timer value of the buffer size increase timer is less than the timer expiration value, determining, at regular intervals, a present current window size and adjusting the updated maximum current window size to maintain the current window size of at least the predetermined threshold.

2. The method of claim 1, wherein adjusting the updated maximum current window size comprises:
    increasing further the maximum window size when the present current window size is less than the predetermined threshold; and
    decreasing the maximum window size when the present current window size is greater than the predetermined threshold.

3. The method of claim 2, wherein, when decreasing the maximum window size, an amount that the maximum window size is decreased is limited to the amount by which the updated maximum window size is greater than the initial maximum window size.

4. The method of claim 1, wherein the regular intervals at which the present current window size is determined and the updated maximum current window size is adjusted corresponds to a maximum transmit unit boundary of the requested data stream.

5. The method of claim 1, wherein the data stream includes one or more data segments, each data segment being encoded into one of a plurality of different versions having different fidelity levels, and wherein initial data segments received as part of the data stream have a first fidelity level.

6. The method of claim 5, wherein each fidelity level includes one or more of video data at one or more different resolutions or frame rates and audio data at one or more different bit rates.

7. The method of claim 5, wherein a bit rate level of subsequently received data segments is adjusted to a second fidelity level less than the first fidelity level when the buffer size increase timer reaches the timer expiration value.

8. The method of claim 1, wherein the buffer size increase timer is terminated when the updated maximum window size is adjusted to be no longer larger than the initial maximum window size prior to current timer value of the buffer size increase timer reaching the timer expiration value.

9. A non-transitory computer readable storage medium including instructions that, when executed by a processing device, cause the processing device to perform operations comprising:
   requesting a data stream using a buffer with an initial maximum window size for buffering received data associated with the requested data stream;
   receiving, into the buffer, one or more data segments associated with the data stream;
   removing, from the buffer, one or more data segments for use by a receiving device;
   determining, by the processing device, a current window size of the buffer, wherein the current window size is equal to the maximum window size less any data segments which have been received that have not been removed from the buffer;
   comparing the current window size to a predetermined threshold;
   in response to determining that the current window size is less than the predetermined threshold, increasing, by the processing device, the maximum window size and initiating a buffer size increase timer having a current timer value and a timer expiration value; and
   while the updated maximum window size is larger than the initial maximum window size and the current timer value of the buffer size increase timer is less than the timer expiration value, determining, at regular intervals, a present current window size and adjusting the updated maximum current window size to maintain the current window size of at least the predetermined threshold.

10. The computer readable storage medium of claim 9, wherein adjusting the updated maximum current window size comprises:
   increasing further the maximum window size when the present current window size is less than the predetermined threshold; and
   decreasing the maximum window size when the present current window size is greater than the predetermined threshold.

11. The computer readable storage medium of claim 10, wherein, when decreasing the maximum window size, an amount that the maximum window size is decreased is limited to the amount by which the updated maximum window size is greater than the initial maximum window size.

12. The computer readable storage medium of claim 9, wherein the regular intervals at which the present current window size is determined and the updated maximum current window size is adjusted corresponds to a maximum transmit unit boundary of the requested data stream.

13. The computer readable storage medium of claim 9, wherein the data stream includes one or more data segments, each data segment being encoded into one of a plurality of different versions having different fidelity levels, and wherein initial data segments received as part of the data stream have a first fidelity level.

14. The computer readable storage medium of claim 13, wherein a bit rate level of subsequently received data segments is adjusted to a second fidelity level less than the first fidelity level when the buffer size increase timer reaches the timer expiration value.

15. The computer readable storage medium of claim 10, wherein the buffer size increase timer is terminated when the updated maximum window size is adjusted to be no longer larger than the initial maximum window size prior to current timer value of the buffer size increase timer reaching the timer expiration value.

16. A system comprising:
   a memory including a buffer; and
   a processing device, coupled to the memory to:
      request a data stream using the buffer having an initial maximum window size for buffering received data associated with the requested data stream;
      receive, into the buffer, one or more data segments associated with the data stream;
      remove, from the buffer, one or more data segments for use by a receiving device;
      determine a current window size of the buffer, wherein the current window size is equal to the maximum window size less any data segments which have been received that have not been removed from the buffer;
      compare the current window size to a predetermined threshold;
      in response to determining that the current window size is less than the predetermined threshold, increase the maximum window size and initiate a buffer size increase timer having a current timer value and a timer expiration value; and
      while the updated maximum window size is larger than the initial maximum window size and the current timer value of the buffer size increase timer is less than the timer expiration value, determine at regular intervals a present current window size and adjust the updated maximum current window size to maintain the current window size of at least the predetermined threshold.

17. The system of claim 16, wherein:
   to adjust the updated maximum current window size, the processing device is to increase further the maximum window size when the present current window size is less than the predetermined threshold; and to decrease the maximum window size when the present current window size is greater than the predetermined threshold.

18. The system of claim 16, wherein the regular intervals at which the present current window size is determined and the updated maximum current window size is adjusted corresponds to a maximum transmit unit boundary of the requested data stream.

19. The system of claim 16, wherein the data stream includes one or more data segments, each data segment being encoded into one of a plurality of different versions having different fidelity levels, and wherein initial data segments received as part of the data stream have a first fidelity level.

20. The system of claim 19, wherein each fidelity level includes one or more of video data at one or more different resolutions or frame rates and audio data at one or more different bit rates.

* * * * *